United States Patent
Stawiszynski et al.

(10) Patent No.: US 11,587,264 B2
(45) Date of Patent: Feb. 21, 2023

(54) METHOD AND DEVICE FOR GENERATING AN AUGMENTED IMAGE

(71) Applicant: MOTOROLA SOLUTIONS, INC., Chicago, IL (US)

(72) Inventors: Maciej Stawiszynski, Cracow (PL); Pawel Jurzak, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 153 days.

(21) Appl. No.: 16/771,170

(22) PCT Filed: Dec. 18, 2017

(86) PCT No.: PCT/PL2017/050062
§ 371 (c)(1),
(2) Date: Jun. 9, 2020

(87) PCT Pub. No.: WO2019/125191
PCT Pub. Date: Jun. 27, 2019

(65) Prior Publication Data
US 2021/0142528 A1      May 13, 2021

(51) Int. Cl.
*G06T 11/00*      (2006.01)
*H04N 19/46*      (2014.01)
(Continued)

(52) U.S. Cl.
CPC .......... *G06T 11/00* (2013.01); *G06F 16/5866* (2019.01); *G06V 10/40* (2022.01);
(Continued)

(58) Field of Classification Search
CPC .................. G06T 11/00; H04N 19/46
See application file for complete search history.

(56) References Cited

U.S. PATENT DOCUMENTS 6,629,104 B1   9/2003  Parulski et al.
8,081,635 B2   12/2011 Bekiares et al.
(Continued)

OTHER PUBLICATIONS

Examination Report issued by the United Kingdom Intellectual Property Office for Application No. 2008818.3 dated Dec. 16, 2021 (1 page).

(Continued)

*Primary Examiner* — Yi Yang
(74) *Attorney, Agent, or Firm* — Michael Best & Friedrich LLP

(57) ABSTRACT

An electronic device and method for generating an augmented image. The device includes an image sensor and an electronic processor. The electronic processor is configured to receive an image, retrieve a set of keywords, and identify a first set of features within the image corresponding to at least one keyword from the set of keywords, producing first metadata. The electronic processor is configured to compress the image, identify a second set of features within the compressed image, producing second metadata, and determine missing metadata between the first metadata and the second metadata. The electronic processor is configured to generate an augmented image by associating the missing metadata to the compressed image and perform at least one selected from the group consisting of transmitting the augmented image to another device and decompressing the augmented image to create a decompressed image and presenting the decompressed image including the missing metadata.

10 Claims, 5 Drawing Sheets

(51) Int. Cl.
  *G06F 16/58* (2019.01)
  *G06V 10/40* (2022.01)
  *G06V 10/70* (2022.01)
  *G06V 20/52* (2022.01)

(52) U.S. Cl.
  CPC ............ *G06V 10/768* (2022.01); *G06V 20/52* (2022.01); *H04N 19/46* (2014.11); *G06V 2201/10* (2022.01)

(56) References Cited

U.S. PATENT DOCUMENTS

| | | | |
|---|---|---|---|
| 9,628,673 B2 | 4/2017 | Mei et al. | |
| 2003/0122942 A1 | 7/2003 | Parker et al. | |
| 2006/0015811 A1* | 1/2006 | Tanaka ................. | G06F 40/169 715/230 |
| 2013/0061174 A1* | 3/2013 | Buchanan .......... | G06Q 30/0601 715/810 |
| 2013/0077882 A1* | 3/2013 | Venkataraman ..... | H04N 19/625 382/233 |
| 2013/0094775 A1 | 4/2013 | Pomianowski et al. | |
| 2014/0254936 A1* | 9/2014 | Sun ........................... | G06T 9/00 382/195 |
| 2015/0172726 A1* | 6/2015 | Faramarzi ............ | H04N 19/132 375/240.24 |
| 2015/0261789 A1* | 9/2015 | Wong ...................... | G06F 16/54 707/711 |
| 2016/0162024 A1* | 6/2016 | Bombacino ........... | G06F 3/0488 345/156 |
| 2017/0187994 A1 | 6/2017 | Tatourian et al. | |

OTHER PUBLICATIONS

Tesic J, "Metadata Practices for Consumer Photos", IEEE Multimedia, IEEE Service Center, New York, NY, US, vol. 12, No. 3, Jul. 31, 2005 (Jul. 31, 2005), pp. 86-92, XP011137101, ISSN: 1070-986X, DOI: 10.1109/MMUL.2005.50 the whole document (7 pages).

Sayantani Ghosh. et al. "A Tutorial Review of Automatic Image Tagging Technique Using Text Mining" International Journal of Research in Engineering and Technology, Mar. 25, 2013 (Mar. 25, 2013), pp. 282-289, XP55504609,DOI: 10.15623/ijret.2013.020301 Retrieved from the Internet:URL:https://ijret.org/volumes/2013v02/i03/IJRET20130203010.pdf [retrieved on Sep. 5, 2018] (8 pages).

International Search Report and Written Opinion for related International Application No. PCT/PL2017/050062 (17 pages).

* cited by examiner

METHOD AND DEVICE FOR GENERATING AN AUGMENTED IMAGE

BACKGROUND OF THE INVENTION

Public safety personnel patrolling or responding to an incident in an area may need to locate a suspect, a missing person, a stolen vehicle, or other persons or objects of interest (subjects). In some cases, visual media (for example, photos and video) may be necessary for documentation, analysis, and communication between personnel. Accordingly public safety personnel may use image capturing devices (for example, a body-worn camera, a camera mounted on or incorporated in a drone or a vehicle such as an in-vehicle dash camera), which captures images of the area to assist them in locating subjects or key information about an incident.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
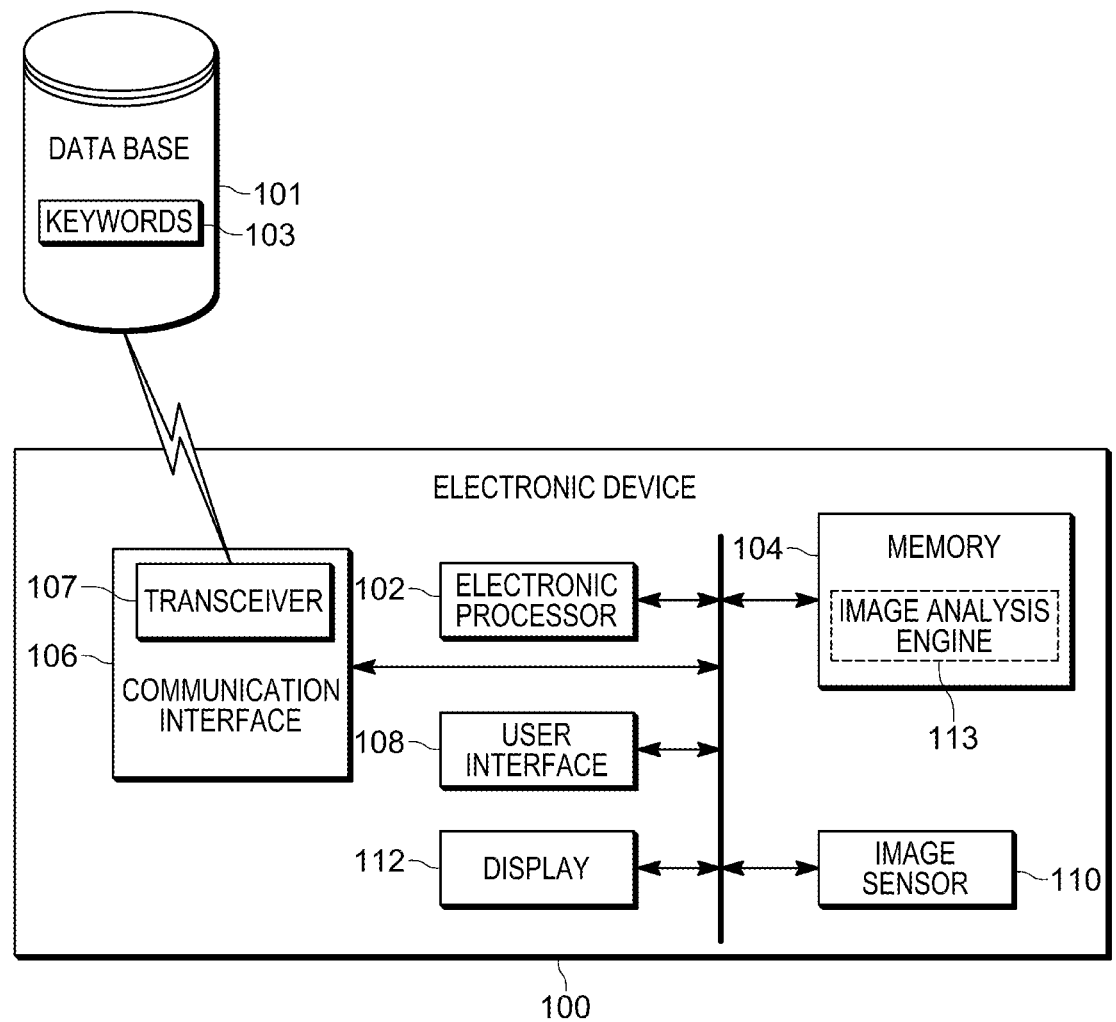
FIG. 1 is a diagram of an electronic device in accordance with some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Quick and accurate identification of features and characteristic details of persons, objects, and entities within an incident scene can improve outcomes for public safety patrol and response efforts. Such personnel may utilize visual media (i.e. photos and video) to communicate, analyze, and document information. Visual media may be compressed before transmission between devices in order to preserve transmission bandwidth and storage memory on the device. However, some compression methods negatively affect the quality of photos, obstructing particular details within a captured incident scene. In particular, portions of image data may be lost or rendered unidentifiable during the compression process.

Accordingly, embodiments described herein provide, among other things, a device and method for generating augmented images. More particularly and as will be described in greater detail, embodiments described herein provide, among other things, a technique for solving problems associated with lost or degraded image data by, in one example, adding or associating metadata (to a compressed image) of features identified in an original image but lost (or rendered unidentifiable) in the compression process.

One example embodiment provides an electronic device. The electronic device includes an image sensor and an electronic processor. The electronic processor is configured to receive the image and retrieve, from a memory, a set of keywords. The electronic processor is also configured to identify a first set of features within the image corresponding to at least one keyword from the set of keywords, producing first metadata and compress the image to create a compressed image. The electronic processor is further configured to identify a second set of features within the compressed image corresponding to at least one keyword from the set of keywords, producing second metadata, compare the first metadata to the second metadata, generating a comparison, and determine, based on the comparison, missing metadata between the first metadata and the second metadata. The electronic processor is configured to generate an augmented image by associating the missing metadata to the compressed image and perform at least one selected from the group consisting of transmitting the augmented image to another device and decompressing the augmented image to create a decompressed image and presenting the decompressed image including the missing metadata to a user via a display.

Another example embodiment provides a method of generating an augmented image. The method includes receiving an image from an image sensor, retrieving, from a memory, a set of keywords, and identifying a first set of features within the image corresponding to at least one keyword from the set of keywords, producing first metadata. The method further includes compressing the image to create a compressed image, identifying a second set of features within the compressed image corresponding to at least one keyword from the set of keywords, producing second metadata, comparing the first metadata to the second metadata, generating a comparison, and determining, based on the comparison, missing metadata between the first metadata and the second metadata. The method also includes associating the missing metadata to the compressed image to create an augmented image, and performing at least one selected from the group consisting of transmitting the augmented image to another device and decompressing the augmented image to create a decompressed image and presenting the decompressed image including the missing metadata to a user via a display.

For ease of description, some or all of the example systems presented herein are illustrated with a single example of each of its component parts. Some examples may not describe or illustrate all components of the systems. Other example embodiments may include more or fewer of each of the illustrated components, may combine some components, or may include additional or alternative components.

FIG. 1 is a diagram of an electronic device 100 in accordance with some embodiments. In the example illustrated, the electronic device 100 includes an electronic processor 102, a memory 104, a communication interface 106, a user interface 108, and an image sensor 110. In some embodiments, the electronic device 100 includes a display 112. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. The electronic device 100 is presented as an example that may be programmed and configured to carry out the functions described herein. In some embodiments, the electronic device 100 may be a handheld device or a wearable device. For example, the electronic device 100 may be a portable communication device, such as, for example a portable two-way radio including a camera, a body-worn camera, a smart telephone, a tablet computer, and the like. In some embodiments, components of the electronic device 100 may be separately implemented, and may be communicatively coupled by a bus or by a suitable communication network. For example, the electronic device 100 may include a dash camera in a vehicle coupled to a mobile two-way radio, a network-connected portable computer, or similar device in or coupled to the vehicle. It should be understood that, in other constructions, the electronic device 100 includes additional, fewer, or different components than those illustrated in FIG. 1.

As illustrated in FIG. 1, in some embodiments, the electronic device 100 is communicatively coupled to, and writes data to and from, one or more of a remote server or a database 101. The database 101 may be a database housed on a suitable database server communicatively coupled to and accessible by the recognition device 100. In alternative embodiments, the database 101 may be part of a cloud-based database system accessible by the electronic device 100 over one or more networks. In some embodiments, all or part of the database 101 may be locally stored on the electronic device 100, for example within the memory 104. In some embodiments, as described below, the database 101 electronically stores one or more predetermined keywords 103. Each keyword 103 describes a type of detail or characteristic of a subject. As explained in further detail below, one or more of the keywords 103 is used by the electronic device 100 to identify particular details within an image captured by the image sensor 110. In some embodiments, one or more of the keywords 103 are stored within the memory 104. In some embodiments, the database 101 is part of a computer-aided dispatch system. It should be understood that in some embodiments the electronic device 100 may be configured to communicate and implement the methods described herein with more than one database.

The electronic processor 102 obtains and provides information (for example, from the memory 104 and/or the communication interface 106), and processes the information by executing one or more software instructions or modules, capable of being stored, for example, in a random access memory ("RAM") area of the memory 104 or a read only memory ("ROM") of the memory 104 or another non-transitory computer readable medium (not shown). The software can include firmware, one or more applications, program data, filters, rules, one or more program modules, and other executable instructions. The electronic processor 102 is configured to retrieve from the memory 104 and execute, among other things, software related to the control processes and methods described herein.

The memory 104 can include one or more non-transitory computer-readable media, and includes a program storage area and a data storage area. The program storage area and the data storage area can include combinations of different types of memory, as described herein. The memory 104 may take the form of any non-transitory computer-readable medium. In the embodiment illustrated, the memory 104 stores, among other things, an image analysis engine 113. The image analysis engine 113 analyzes images captured by the image sensor 110 to detect and identify one or more characteristic details of one or more of a subject within the captured image(s). The characteristic detail (or feature) is a detail that may be used to identify a particular subject (for example, a person, an object, and/or an entity). For example, the characteristic detail analyzed in an image or series of images is an object, shape, color, text, and the like within the image or series of images. In some embodiments, the image analysis engine 113 includes other features (for example, optical character recognition and/or neural networks) for characteristic detection and analysis.

In some embodiments, the image analysis engine 113 is configured to perform machine learning functions. Machine learning generally refers to the ability of a computer to learn, perform a task or conduct an analysis without being explicitly programmed to do so. In some embodiments, a computer program (for example, a learning engine) is configured to construct an algorithm based on inputs. Supervised learning involves presenting a computer program with example inputs and their desired (for example, actual) outputs. The computer program is configured to learn a general rule (for example, an algorithm) that maps the inputs to the outputs from the training data it receives. Machine learning can be performed using various types of methods and mechanisms. Example machine learning engines include decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using one or more of these approaches, a computer program can ingest, parse, and understand data and progressively refine algorithms for data analytics. For example, the image analysis engine 113 may utilize machine learning to improve identification of characteristic details of one or more subjects within images captured by the image sensor 110 and associating the characteristic details with a particular role and/or incident-based context.

For the purposes of the processing described herein, a "subject" is any distinguishable being or inanimate object. For example, when the subject is a human being the characteristic detail of the subject detected by the image analysis engine 113 may be one or more of physical feature or an anatomical feature. For example, the characteristic may be one or more of a facial feature, a height, a hair color, a skin tone, a tattoo, a birthmark, an eye color, a body shape, a gait, a feature of a wearable article (for example, jewelry, a clothing color, clothing pattern, or a logo), or another physical feature, with which the person can reasonably be identified. The wearable article may be an article of clothing or a wearable accessory (for example, a piece of jewelry, a hat or headpiece, a bag, a purse, or a backpack) on the subject. A subject may also be an inanimate object like a vehicle. A subject may also be a key object including visual information (for example, a phone number, a street name, a sign, and the like.)

The communication interface 106 may include a transceiver 107 for wirelessly coupling to wireless networks (for example, land mobile radio (LMR) networks, Long Term Evolution (LTE) networks, Global System for Mobile Communications (or Groupe Spécial Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, combinations or derivatives thereof, and other suitable networks, including future-developed networks. Alternatively, or in addition, the communication interface 106 may include a connector or port for receiving a connection to a wired network (for example, Ethernet). The transceiver 107 obtains information and signals from, and provides information and signals to, (for example, over one or more wired and/or wireless connections) devices both internal and external to the electronic device 100. Although the transceiver 107 is illustrated as a single component, in some embodiments the transceiver 107 is implemented as a transmitter and receiver separate from each other.

The user interface 108 operates to receive input from, for example, a user of the recognition device 100, to provide system output, or a combination of both. The user interface 108 obtains information and signals from, and provides information and signals to, (for example, over one or more wired and/or wireless connections) devices both internal and external to the electronic device 100. Input may be provided via, for example, a keypad, a microphone, soft keys, icons, or soft buttons on the display 112, a scroll ball, buttons, and the like. System output may be provided via the display 112. The display 112 is a suitable display such as, for example, a liquid crystal display (LCD) touch screen, or an organic light-emitting diode (OLED) touch screen. The electronic device 100 may implement a graphical user interface (GUI) (for example, generated by the electronic processor 102, from instructions and data stored in the memory 104, and presented on the display 112), that enables a user to interact with the electronic device 100. In some embodiments, the electronic device 100 operates or is integrated with a head-mounted display (HMD) or an optical head-mounted display (OHMD).

The image sensor 110 is a device, for example a video sensor or a camera, designed or configured to capture an image or series of images within a field of view. The image sensor 110 communicates the captured media to the electronic processor 102. In the context of the image sensor 110, the term "media" may refer to one or more digital images or video captured by the image sensor 110 or processed by the electronic processor 102. Although illustrated in FIG. 1 as being located within the electronic device 100, the image sensor 110 may be located outside of the electronic device 100. In some embodiments, more than one image sensor 110 is implemented.

Figure 2:
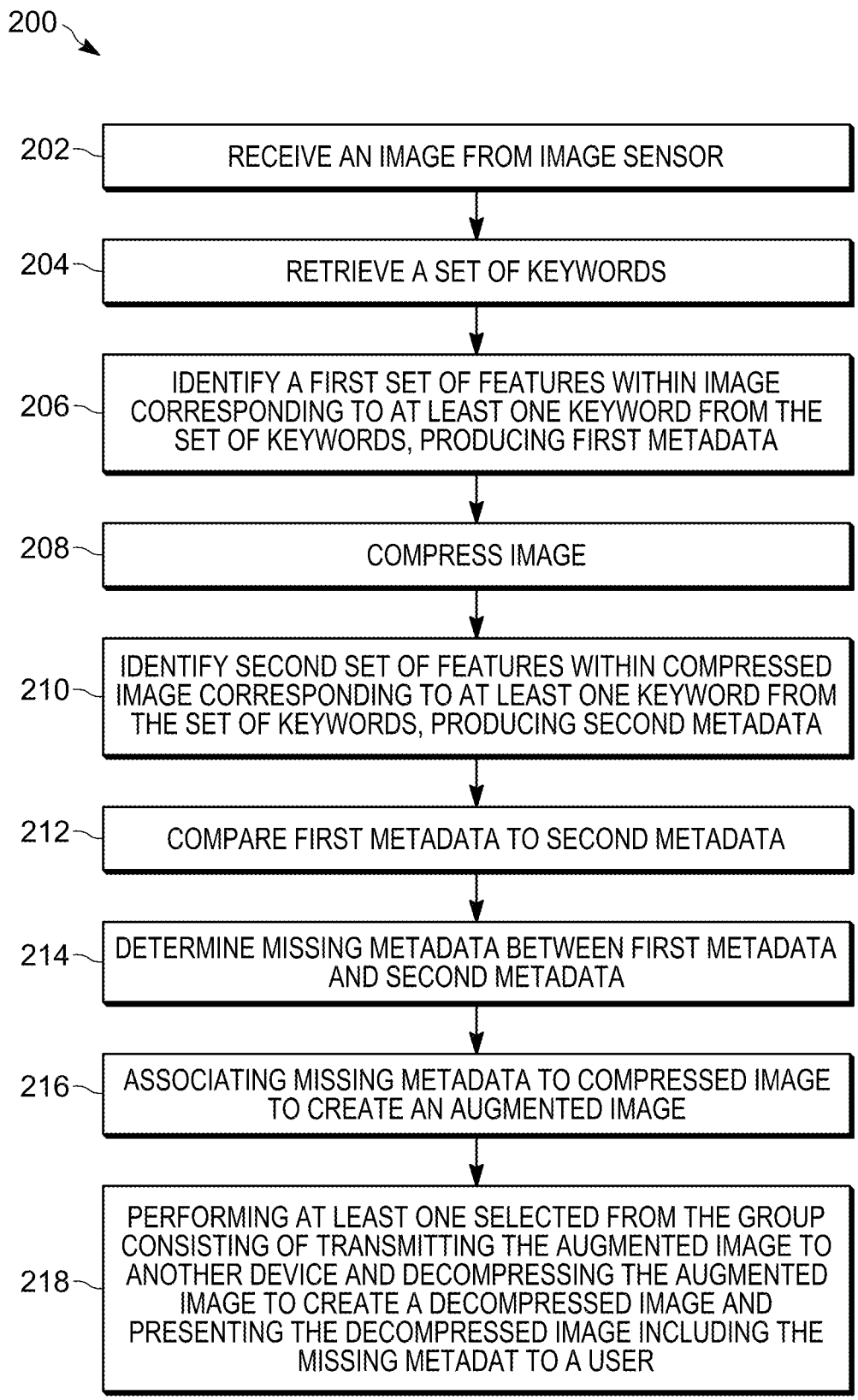
FIG. 2 is a flow chart of a method of generating an augmented image in accordance with some embodiments.

FIG. 2 illustrates an example method 200 for generating an augmented image. As an example, the method 200 is explained in terms of the electronic device 100 capturing and analyzing an image captured by the image sensor 110 to determine one or more characteristic details within the image. The method 200 is described as being performed by the electronic device 100 and, in particular, the electronic processor 102 executing the image analysis engine 113. However, it should be understood that in some embodiments, portions of the method 200 may be performed by other devices, including for example, a computer located in a public safety vehicle and wirelessly coupled to the electronic device 100.

At block 202, the electronic processor 102 receives an image from the image sensor 110. The electronic processor 102 retrieves a set of keywords 103 from a memory at block 204. The memory may be a memory local to the electronic device 100 (for example, the memory 104) or a remote database separate from the device 100 (for example, the database 101). Each keyword 103 defines a type of characteristic detail or feature for the image analysis engine 113 to find within the image. For example, as described above, the keyword 103 may be "phone number," "logo," "physical feature," and so on.

In some embodiments, the electronic processor is further configured to determine a role-based context and/or an incident-based context and retrieve the set of keywords based on the role-based context and/or the incident-based context. Specifically, the role of a user of the electronic device 100 and/or the type of incident in which the device 100 is capturing images of is/are used in determining which keywords 103 may be relevant in the particular situation. The role-based context may be based on the user's agency (for example, police, fire, military), and the user's assigned role within the agency or at the incident (for example, perimeter security, fire suppression, support services, medical, supervisory, etc.). Another example is the user's current task or recently assigned tasks (for example, providing medical care to a particular person or area), and information about recently assigned tasks (both complete and incomplete). Another example is the user's current status including the user's deployment status (for example, on call for duty or en route to an incident scene), the user's shift status (for example, just on duty, mid-shift, end of shift, off shift), and the user's group status (for example, part of a larger group or an individual deployment). Another example of a role-based context is the user's relevant skills or training (for example, hazardous materials training, advanced rescue training, or particular medical training). Another example is any specialized equipment or vehicles associated with the user (that is, an equipment association) (for example, cutting equipment, special weapons, an ambulance, a squad car, etc.). The incident-based context may be, for example, a medical emergency, an investigation, a traffic incident, and the like. In some embodiments, the electronic processor is further configured to determine a communication group or talk group that the device 100 is associated with (for example, assigned to) and retrieves, from the memory 104 and/or a remote database, a set of keywords based on the communication group or talk group that the device 100 is associated with.

Based on the determined role and/or incident, the set of keywords 103 may be different for an image. For example, if the role-based context is determined to be a public safety officer and the incident is an incident scene, the keywords 103 may include "footprint," "weapon," and/or "blood trail." For the same incident-based context and the same image, when the role-based context is determined to be for a medical officer, the keywords 103 may include "discolored skin" and "medical bracelet."

Figure 3A:
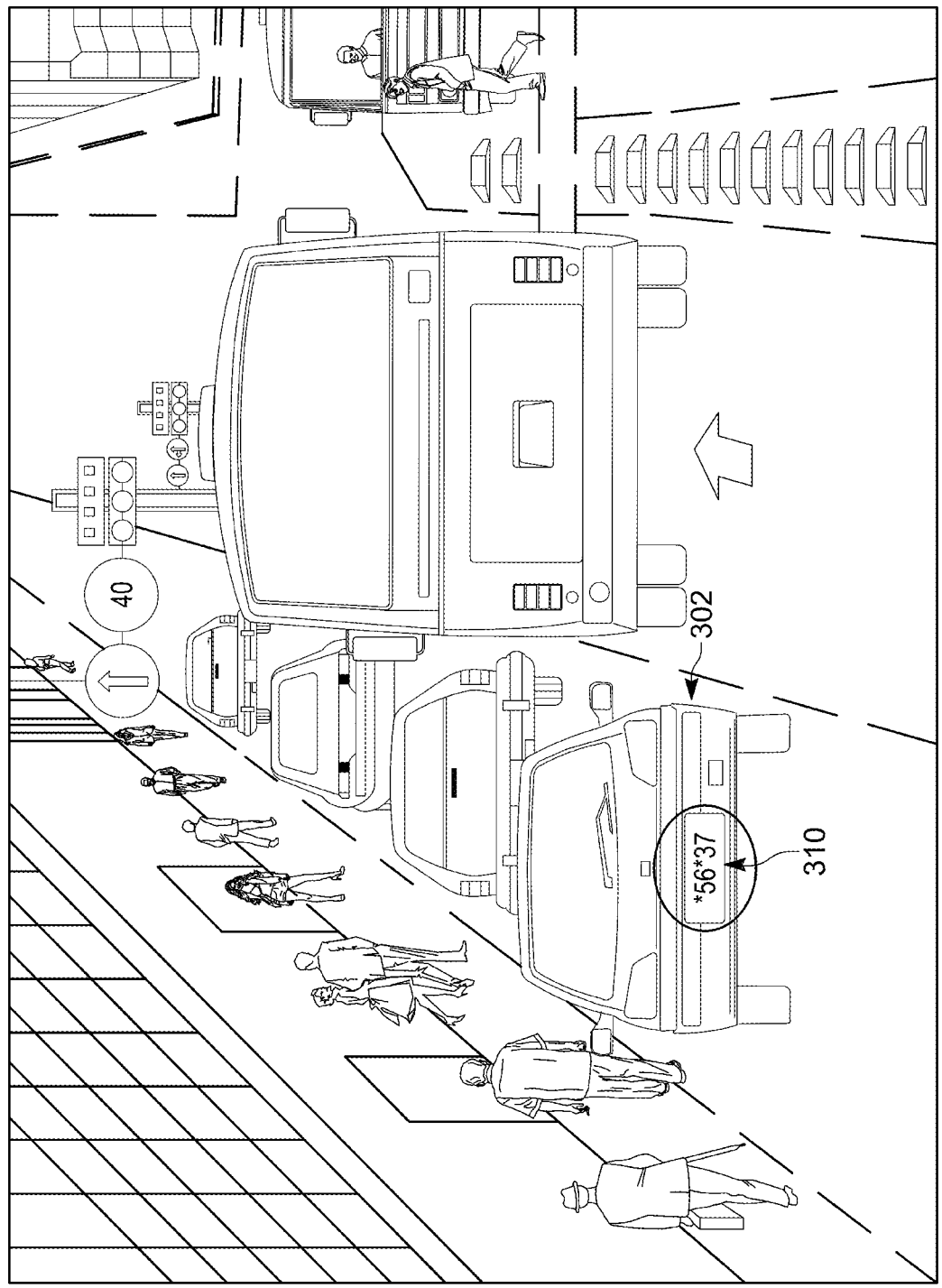
FIG. 3A is an image captured by the electronic device of FIG. 1 in accordance with some embodiments.

At block 206, the electronic processor 102 identifies a first set of characteristic details or features within the image corresponding to at least one keyword from the set of keywords, producing first metadata. Specifically, the electronic processor 102, using the image analysis engine 113, analyzes the image to find features related to one or more of the keywords 103. For example, FIG. 3 is an image 300 captured by the image sensor 110 at block 202 of the method 200. The image 300 in this case is a traffic scene including a vehicle 302. At block 204, the electronic processor 102 retrieves a set of keywords 103. In this case, one of the keywords 103 may include "license plate number." Based on this keyword, the electronic processor 102 uses the image analysis engine 113 to identify any characteristic details within the image 300 corresponding to a "license plate number" (block 206 of the method 200 of FIG. 2). In this case, a plate 304 on the vehicle 302 may be identified. The electronic processor 102 may then produce metadata based on the plate 304. In this example, the metadata may include the specific license plate number (in this case 56-37) as well as the state in which the plate 304 is from.

Returning to FIG. 2, at block 208 the electronic processor 102 compresses the image, creating a compressed image. For example, the electronic processor 102 applies JPEG or another suitable compression standard/technique to produce a compressed image. At block 210, the electronic processor 102, using the image analysis engine 113, identifies a second set of features within the compressed image corresponding to at least one keyword from the set of keywords, producing second metadata. In some embodiments, the electronic processor 102 utilizes software and hardware to electronically detect and classify objects within captured images and video streams (for example, video processors and object classifier algorithms) within the image 300. Object classification is known in the art, and will not be described in detail herein.

At block 212, the electronic processor 102 compares the first metadata with the second metadata, generating a comparison. The electronic processor 102 then determines, based on the comparison, missing metadata between the first metadata and the second metadata (block 214). Specifically, the electronic processor 102 determines whether any characteristic details identified within the image are lost after the image is compressed.

Figure 3B:
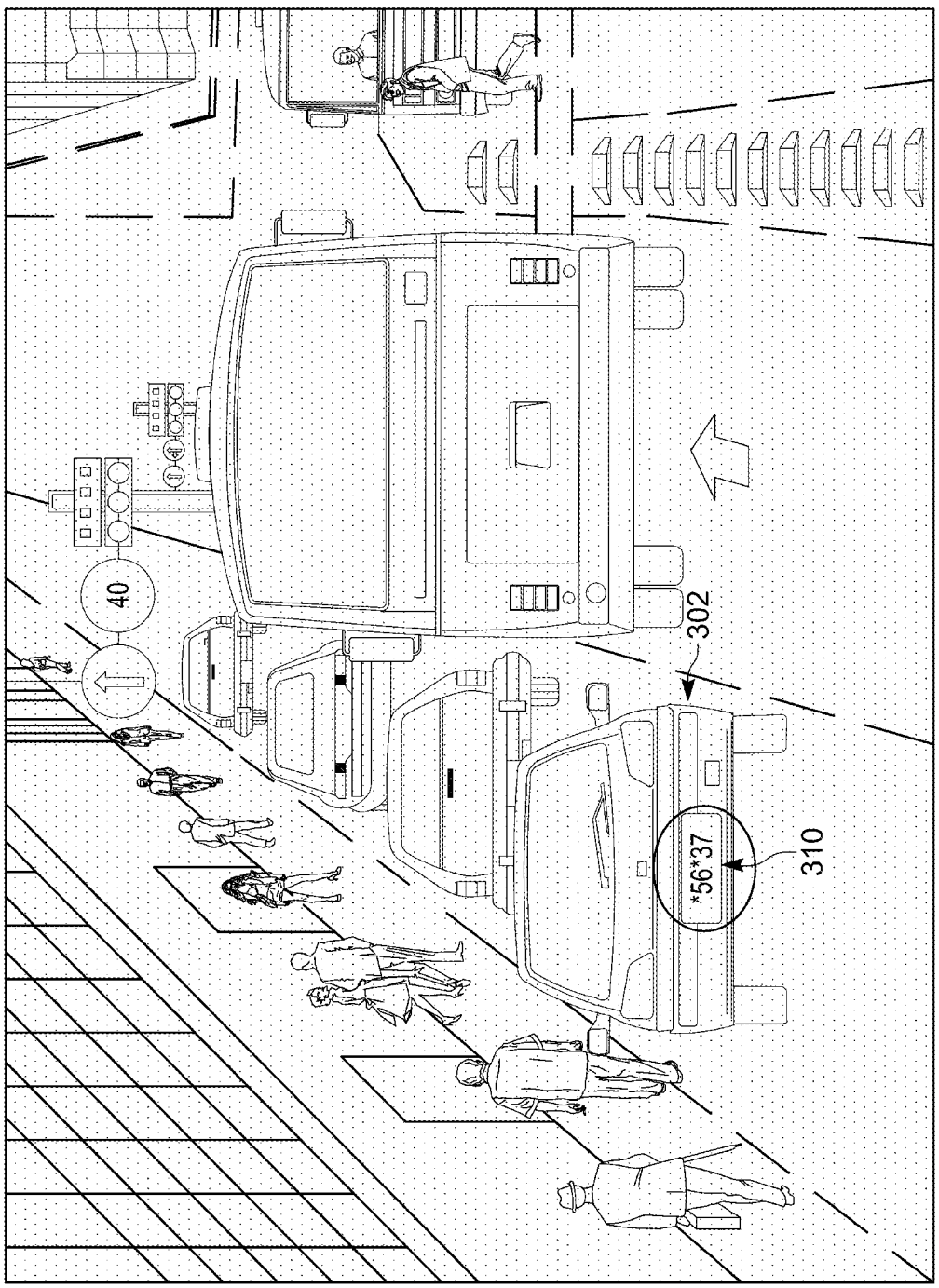
FIG. 3B is a compressed image of the image of FIG. 3A generated by the electronic device of FIG. 1 in accordance with some embodiments.

For example, FIG. 3B illustrates a compressed image 306 (the image 300 after compression). As represented by the stippling, the compressed image 306 is less clear/has a lower resolution due to the compression. The electronic processor 102 identifies a second set of features within the compressed image 306 using the image analysis engine 113 and produces second metadata (block 210 of the method 200 of FIG. 2). The electronic processor 102 then compares the first metadata of the image 300 (produced at block 206 of the method 200 of FIG. 2) to the second metadata of the compressed image 306 to determine whether there is any missing metadata. As shown in FIG. 3B, the license plate 304 within the compressed image 306 is lost (or unidentifiable) after the compression. The electronic processor 102 may determine that the features of the license plate 304 (which are present in the first metadata) are missing in the second metadata produced from the analysis of the compressed image 306.

Returning to FIG. 2, at block 216, the electronic processor 102 associates the missing metadata to the compressed image to create an augmented image. Specifically, the metadata of the features identified in the original image but lost (or unidentifiable) in the compressed image is added, linked, or attached to the compressed image as additional metadata. For example, returning to FIG. 3B, the missing metadata (the license plate number 56-37 and the state the license plate is from) is compressed and attached to the compressed image 306. In some embodiments, the missing metadata is attached to the compressed image 306 by storing the metadata as non-image data (i.e. a tag) in a digital image file of the compressed image 306 (for example, using the Exchangeable image file format (Exif) standard or other applicable standard). In some embodiments, the missing metadata is attached to the compressed image 306 by linking the image file storing the compressed image to a separate file storing the missing metadata.

Figure 3C:
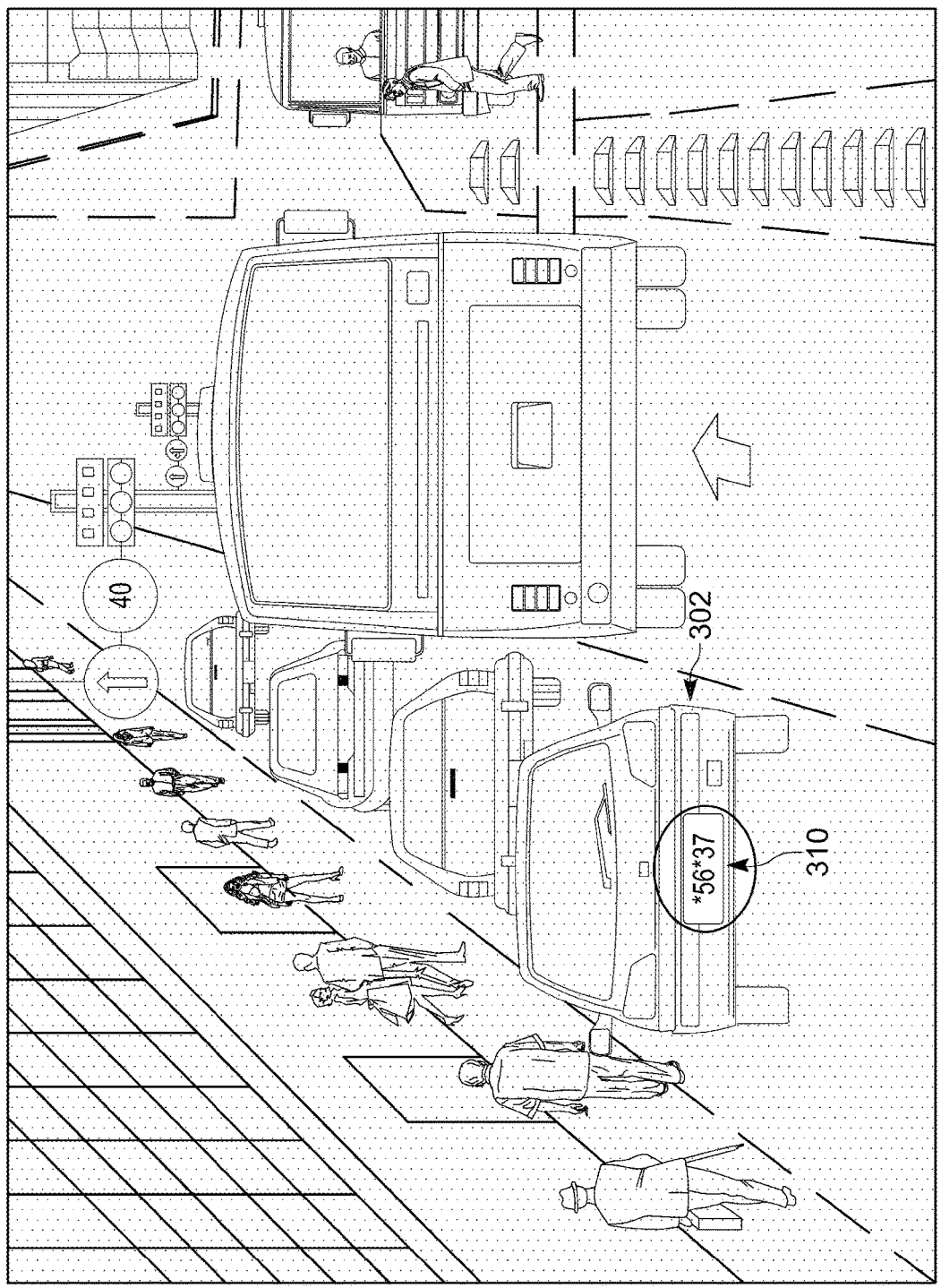
FIG. 3C is a decompressed image of the compressed image of FIG. 3B generated by the electronic device of FIG. 1 in accordance with some embodiments.

Returning to FIG. 2, at block 218, the electronic processor 102 performs at least one selected from the group consisting of transmitting the augmented image to another device and decompressing the augmented image to create a decompressed image and presenting the decompressed image including the missing metadata to a user. Specifically, the electronic processor 102 may transmit, via the transceiver 107, the augmented image to another device (for example, an electronic communication device like a cellphone, a tablet, a computer, and the like or a database server for storage). The electronic processor 102 may also decompress the augmented image and present the decompressed image including the missing metadata on the display 112 for a user of the device 100 to see. In some embodiments, the decompressed image is presented with at least one label based on the missing metadata. Specifically, labels reciting and/or describing the missing metadata may be incorporated within the presentation of the decompressed image on the display 112. In some embodiments, the decompressed image is presented on the display 112 with at least one feature rendered based on the missing metadata. The rendered feature may be a feature included in the missing metadata. For example, FIG. 3C illustrates a decompressed image 308. The decompressed image 308 includes missing metadata 310 (i.e. the license plate 304 including the license plate number and state) rendered into the decompressed image 308 so that the information can be identified by a user of the device 100. Alternatively or in addition to the rendered features, a label including the license plate number and state may be incorporated into the display 112.

It should be noted that a plurality of hardware and software based devices, as well as a plurality of different structural components may be utilized to implement the invention. In some embodiments, the invention provides a software application that is executable on a personal computing device, such as a smart phone, tablet computer, smart watch, a portable radio, a body-worn camera device, and the like. In some embodiments, the software application may be stored and executed by a remote computing device, such as a server. In particular, the software application may be executed by a server, and a user can access and interact with the software application using a recognition device. Also, in some embodiments, functionality provided by the software application as described above may be distributed between a software application executed by a user's portable communication device and a software application executed by another electronic process or device (for example, a server) external to the recognition device. For example, a user can execute a software application (for example, a mobile application) installed on his or her smart device, which is configured to communicate with another software application installed on a server.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having,"

"includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An electronic device comprising:
an image sensor configured to capture an image; and
an electronic processor communicatively coupled to the image sensor and configured to:
receive the image;
determine at least one selected from a group consisting of a role-based context or an incident-based context;
retrieve, from a memory, a set of keywords based on one of the role-based context or the incident-based context, each keyword defining a characteristic detail of a subject captured within image for the electronic processor to attempt to identify within the image, wherein the characteristic detail is a physical feature of the subject that may be used to identify the subject;
identify a first set of features within the image corresponding to at least one keyword from the set of keywords, producing first metadata;
compress the image to create a compressed image;
identify a second set of features within the compressed image corresponding to at least one keyword from the set of keywords, producing second metadata;
compare the first metadata to the second metadata, generating a comparison;
determine, based on the comparison, missing metadata between the first metadata and the second metadata, wherein the missing metadata appears in the first metadata and does not appear in the second metadata and identifies at least one characteristic detail within the image that was lost when the image was compressed;
generate an augmented image by associating the missing metadata to the compressed image; and
perform at least one selected from the group consisting of (1) transmitting the augmented image to another device and (2) decompressing the augmented image to create a decompressed image and presenting the decompressed image including the missing metadata via a display.

2. The electronic device of claim 1, wherein the electronic processor is further configured to determine a communication group in which the electronic device is associated with, and retrieve, from the memory, the set of keywords based on the communication group.

3. The electronic device of claim 1, wherein the memory is one selected from the group consisting of a local memory of the electronic device and a remote database.

4. The electronic device of claim 1, wherein decompressing the augmented image to create a decompressed image and presenting the decompressed image including the missing metadata via the display includes presenting the decompressed image with at least one label based on the missing metadata.

5. The electronic device of claim 1, wherein decompressing the augmented image to create a decompressed image and presenting the decompressed image including the missing metadata via the display includes presenting at least one feature rendered based on the missing metadata via the display.

6. A method for generating an augmented image on an electronic device, the method comprising:

receiving an image from an image sensor;

determining at least one selected from a group consisting of a role-based context and an incident-based context;

retrieving, from a memory, a set of keywords based on one or both of the role-based context and the incident-based context, each keyword defining a characteristic detail of a subject captured within image for the electronic device to attempt to identify within the image, wherein the characteristic detail is a physical feature of the subject that may be used to identify the subject;

identifying a first set of features within the image corresponding to at least one keyword from the set of keywords, producing first metadata;

compressing the image to create a compressed image;

identifying a second set of features within the compressed image corresponding to at least one keyword from the set of keywords, producing second metadata;

comparing the first metadata to the second metadata, generating a comparison;

determining, based on the comparison, missing metadata between the first metadata and the second metadata, wherein the missing metadata appears in the first metadata and does not appear in the second metadata and identifies at least one characteristic detail within the image that was lost when the image was compressed;

associating the missing metadata to the compressed image to create an augmented image; and performing at least one selected from the group consisting of (1) transmitting the augmented image to another device and (2) decompressing the augmented image to create a decompressed image and presenting the decompressed image including the missing metadata via a display.

7. The method of claim 6 further comprising determining a communication group in which the device is associated with and retrieving, from the memory, the set of keywords based on the communication group.

8. The method of claim 6, wherein the memory is one selected from the group consisting of a local memory of the electronic device and a remote database.

9. The method of claim 6, wherein decompressing the augmented image to create a decompressed image and presenting the decompressed image including the missing metadata via the display includes presenting the decompressed image with at least one label based on the missing metadata.

10. The method of claim 6, wherein decompressing the augmented image to create a decompressed image and presenting the decompressed image including the missing metadata via the display includes presenting at least one feature rendered based on the missing metadata via the display.

* * * * *